March 17, 1925.
W. B. WILLSEA
COVER FOR VESSELS
Filed April 11, 1924
1,529,732
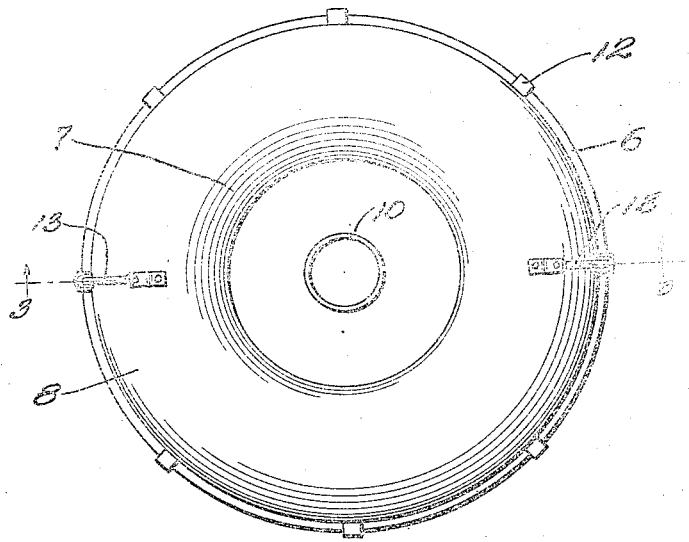
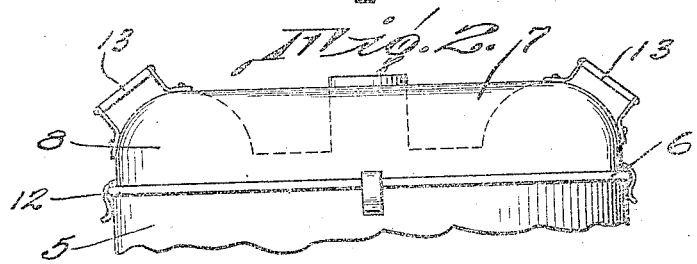
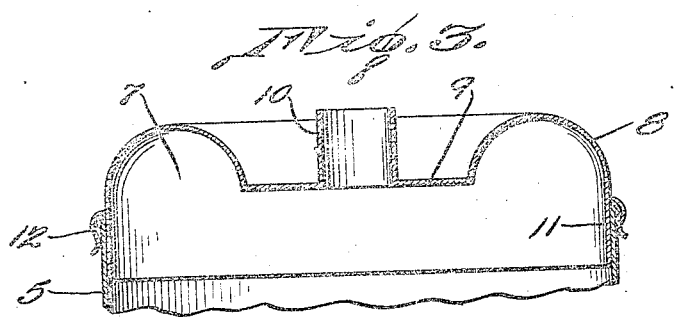
Inventor
By William B. Willsea.
Attorney Patented Mar. 17, 1925.

1,529,732

UNITED STATES PATENT OFFICE.

WILLIAM B. WILLSEA, OF YONKERS, NEW YORK.

COVER FOR VESSELS.

Application filed April 11, 1924. Serial No. 705,765.

*To all whom it may concern:*

Be it known that I, WILLIAM B. WILLSEA, a citizen of the United States, residing at Yonkers, in the county of Westchester and State of New York, have invented certain new and useful Improvements in a Cover for Vessels, of which the following is a specification.

This invention relates to improvements in covers for vessels and more particularly to vessels employed for boiling purposes.

An important object of the invention is to provide an improved cover which will prevent the boiling over of liquids being heated therein.

A further object of the invention is to provide a cover of this character which may be securely retained upon the cooking vessel.

A still further object of the invention is to provide a cover of this character which will permit the escape of steam without the danger of the liquid within the vessel being boiled over upon the stove.

Other objects and advantages of this invention will be apparent during the course of the following description.

In the accompanying drawing forming a part of this specification and in which like numerals are employed to designate like parts throughout the same:

Figure 1 is a top plan view of my improved device in position upon a vessel,

Figure 2 is a side elevation of the same, and

Figure 3 is a vertical sectional view taken on the line 3—3 of Figure 1.

In the drawing, wherein for the purpose of illustration is shown the preferred embodiment of my invention, the numeral 5 designates the upper portion of a cooking vessel, which may be of any desired shape or size, and 6 the turned edge usually formed on vessels of this character.

A cover generally denoted by the numeral 7 is adapted to fit snugly within the rim of the cooking vessel 5. An annular elevated ridge 8 is formed around the outer edge of the cover 7 and is substantially semi-circular in cross section as clearly illustrated in Figure 3, the intermediate portion forming a substantially flat plate 9. The central portion of the cover has a cylindrical tube 10 mounted therein preferably opened to form a steam outlet. The lower portion of the cover is provided with an extension rim or flange 11 which is adapted to snugly fit within the rim of the cooking utensil. In order to retain the cover in position upon the vessel I provide a plurality of spring clips 12 secured to the cover rim and adapted to be forced over the turned edge of the vessel and prevent removal of the cover therefrom.

A pair of handles 13 are mounted upon the elevated ridge to permit removal of the cover by the user thereby enabling the same to be raised without danger of burning the hands.

It is obvious that when the liquid within the vessel reaches the boiling point it will be confined within the vessel and prevented from issuing from the side which is usually the case with cooking utensils now commonly employed. The elevated ridge has a tendency to cause the boiling liquid to be thrown back within the receptacle and confined therein.

It is well known that due to the bubbling and rising of the liquid when boiling in a receptacle the liquid is often forced over upon the stove and in addition to marring the appearance of the stove not infrequently extinguishes the gas or other flame employed for heating the receptacle with the dangers incident thereto.

It is to be understood that the form of my invention herein shown and described is to be taken as the preferred example of the same, and that various changes as to the shape, size and arrangement of parts may be resorted to without departing from the spirit of the invention, or the scope of the subjoined claims.

Having thus described my invention, I claim:

1. A vessel cover of the character described comprising a flat disk, a semi-circular ridge formed upon the outer edge of the flat disk, an extension flange formed on the outer edge of the said ridge, a plurality of retaining clips secured to the extension flange, and a cylindrical sleeve formed in the central portion of the said disk.

2. A cover for cooking utensils comprising, a flat disk, a semi-circular ridge formed around the outer edge of the said disk, an extension rim or flange formed upon the lower portion of the said ridge, a plurality of spring clips secured to the extension rim adapted to engage the side of the cooking vessel, and a cylindrical tube formed in the center portion of the said disk.

In testimony whereof, I have affixed my signature in the presence of two witnesses.

WILLIAM B. WILLSEA.

Witnesses:
  DOMINICK JOZZO,
  Mrs. NELLIE WILLSEA.